United States Patent [19]

Jagers

[11] 4,249,443
[45] Feb. 10, 1981

[54] MACHINE FOR SAWING ELONGATED WORK PIECES

[75] Inventor: Leopold Jagers, Euskirchen, Fed. Rep. of Germany

[73] Assignee: Trennjaeger Maschinenfabrik, Fed. Rep. of Germany

[21] Appl. No.: 51,163

[22] Filed: Jun. 22, 1979

[30] Foreign Application Priority Data

Jun. 24, 1978 [DE] Fed. Rep. of Germany ....... 2827776

[51] Int. Cl.³ .................. B23D 47/04; B23D 45/04
[52] U.S. Cl. ............................. 83/490; 83/491; 83/644; 83/646; 83/639
[58] Field of Search ................ 83/490, 597, 601, 607, 83/646, 639, 491

[56] References Cited

U.S. PATENT DOCUMENTS

| 2,801,458 | 8/1957 | Remmen | 83/490 X |
| 3,130,621 | 4/1964 | Else | 83/490 X |
| 3,540,338 | 11/1970 | McEwan et al. | 83/490 |
| 3,656,261 | 4/1972 | Everett | 83/490 X |
| 3,715,946 | 2/1973 | Kaltenbach | 83/490 X |
| 4,036,092 | 7/1977 | Kaltenbach | 83/490 X |

Primary Examiner—Donald R. Schran
Attorney, Agent, or Firm—Holman & Stern

[57] ABSTRACT

A circular saw for elongated work pieces particularly of metal has a saw blade mounted on an arm which is connected by a pivotal mount to a saw frame at one end and which is pivotally connected to a piston and cylinder type raising and lowering assembly at its other end. The arm can be longitudinally moved both with respect to the mount and with respect to the raising and lowering assembly which allows the blade to saw through work pieces of relatively large cross-sectional dimensions.

14 Claims, 10 Drawing Figures

MACHINE FOR SAWING ELONGATED WORK PIECES

BACKGROUND OF THE INVENTION

The invention relates to a machine for cold sawing of elongated, horizontal work pieces, particularly metal work pieces, of the type having a vertical circular saw blade attached to an arm which is pivotable around a horizontal axis, and which is further pivotably connected, through a second pivot at the end of the arm opposite to the first pivot, to an approximately vertically moveable device by which the arm can be raised and lowered.

Such sawing machines are called vertical saws even though the saw blade does not move exactly vertically with respect to the work piece but moves in a circular arc around the swinging pivot. For cold sawing of elongated work pieces such as profiled metal, bars, rods, or tubes, the diameter of cross dimension of which does not exceed the diameter of the saw blade, it is advantageous if while the saw blade is being lowered it is kept centrally over the work piece which is being sawed. This applies both to cuts which are perpendicular to the longitudinal axis of the work piece and cuts which are oblique to it. A known means of assuring this is to shift the chuck jaws by which the work piece is held, in such a way, (depending on the width of the work piece) as to keep the work piece centered underneath the saw blade. This method of shifting the work piece is however costly and requires individual measurement and adjustment, since the chuck jaws which afford the contact surfaces must be moved together.

In addition, with these known saws, the size of the work pieces is limited, since they cannot be wider than the diameter of the saw blade.

An object of the instant invention is to improve a machine of the above-described type, such that the saw blade remains centered over the work piece under conditions of a fixed contact surface and different work piece widths. A further object of the invention is to provide a machine of the above-described type which can cut through work pieces of greater width than the diameter of the saw blade.

SUMMARY OF THE INVENTION

According to the invention in apparatus of the above type, the arm is made moveable, i.e., slidable lengthwise with respect to the swinging pivot.

In a saw according to the invention one chuck jaw can stay fixed so as to form an unvarying contact surface and reference plane. This is particularly advantageous when semiautomatic or fully automatic control is employed. While one contact surface remains fixed and only the opposite chuck jaw is moved, the saw blade can be continuously positioned over the work piece due to the moveability of the arm.

Further, by means of a saw according to the invention very large work pieces can be sawed, in particular very wide shapes, since after part of the work piece has been sawed through the saw blade can be moved over the work piece so that the arm causes the saw blade to advance.

The moving and adjustment of a vertical saw blade of a vertical saw in a direction perpendicular to the longitudinal axis of the part being sawed is in itself known (see for example German O.S. No. 2,646,516 and British Pat. No. 788,064), but in these saws the blade does not swing around a swinging pivot but rather it moves exactly vertically. Consequently, these known saws are costly to build and have substantially greater overall height, which is a particular disadvantage in transporting them.

If the arm which supports the saw blade is shifted i.e., longitudinally translated with respect to the swinging pivot, the vertically moveable device mentioned above moves with the arm, and in the case of larger saw blade movement it causes a slight vertical raising and lowering of the end of the arm which is opposite to the swinging pivot, since the actuatable moveable device typically is pivoted at the underside of the machine table, hence the second end of the arm along with the second pivot moves through a circular arc around the bottom pivot of the actuatable moveable device. This can be avoided for example by making the arm moveable lengthwise with respect to the second pivot.

The arm can be precisely manipulated with respect to the swinging pivot by making the arm moveable lengthwise with respect to the swinging pivot by means of a cylinder-piston assembly. This can be effected by having the cylinder-piston assembly as a part of the arm, with the piston rod being connected to the swinging pivot.

The arm can be fixed with a locking device if it does not need to be moved longitudinally with respect to the swinging arm during the sawing. Also, particularly for work pieces of narrow width, the arm can be fixed with respect to the second pivot with a locking device. It is further provided that the roughly vertically moveable device which is linked at the second pivot is swingably mounted on the machine table at its side i.e., at the end of the device which is opposite to the second pivot; and that said device is fixable relative to the machine table by means of a locking device. Each of these locking devices can be in the form of a two-sided friction catch with a hydraulically actuated clamping piece.

One very simple construction is accomplished by having the actuatable moveable device comprise a cylinder-piston assembly. A particularly strong mounting which allows small tolerances is effected by providing the cylinder-piston assembly with a second cylinder coaxial to the piston rod, whereby the second cylinder is swingable via a pivot at the end of the piston rod and in the telescoped state surrounds the piston-cylinder assembly of the first cylinder, whereby at least the end section of the first cylinder which contains the piston rod bushing is guided in the second cylinder in a sealed fluid-tight fashion.

A space-saving and very advantageous and responsive machine can be obtained by placing the drive for the saw blade at least partly within the arm. In this way the axis of the saw blade can be positioned at approximately the level of the underside of the arm, and part of the drive can protrude a distance underneath the arm which distance corresponds to the vertical clearance of a large I-beam. In this way the downward projecting part of the drive can be moved into the interior of the part being sawed, so that even parts of great height can be cut.

DESCRIPTION OF PREFERRED EMBODIMENT

Figure 1:
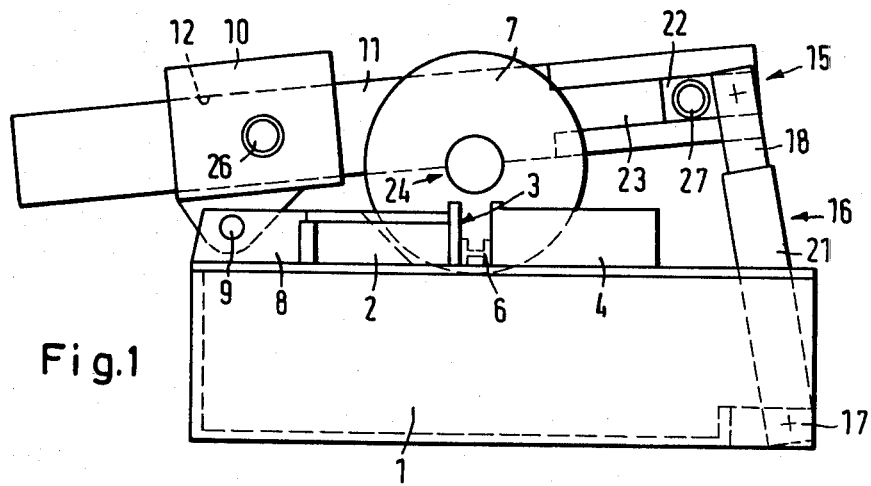
FIGS. 1 through 3 show a saw according to the invention, in side elevation in a first operating mode with the arm fixed with respect to the vertically moveable device, and with three different large articles as work pieces.
Figure 2:
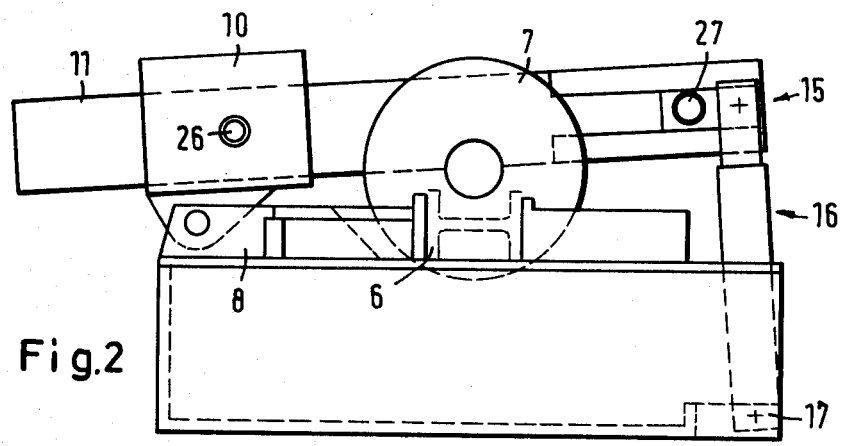
Figure 3:
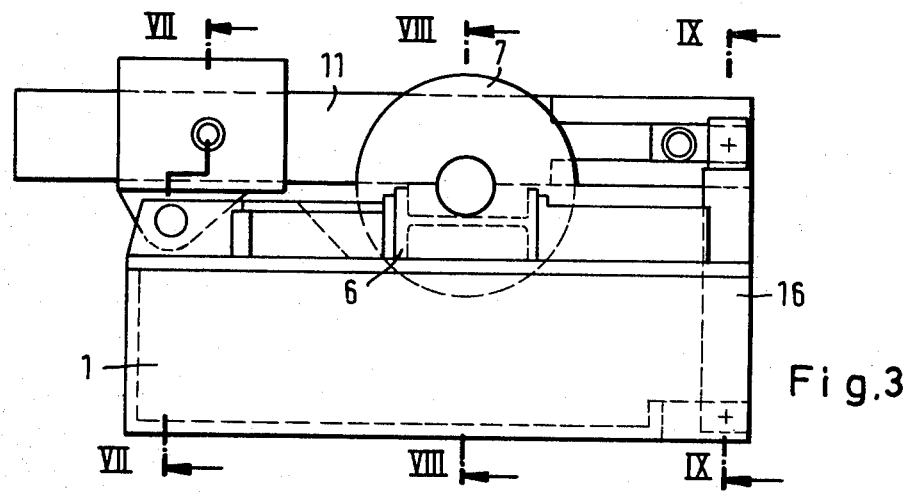
Figure 4:
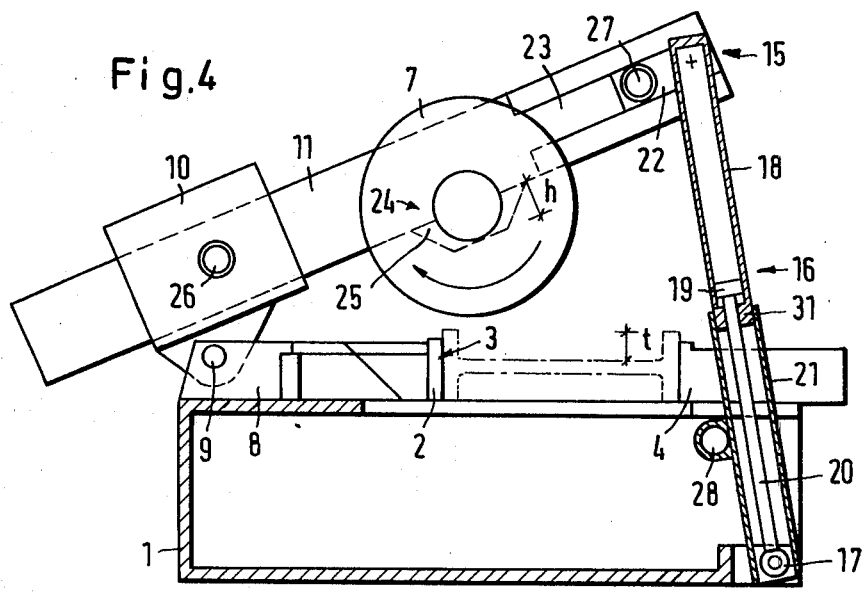
FIGS. 4 through 6 show the saw in a second operating mode, with the arm being longitudinally shifted with respect to the vertically moveable device, and with a work piece of large dimensions being partially cut.
Figure 5:
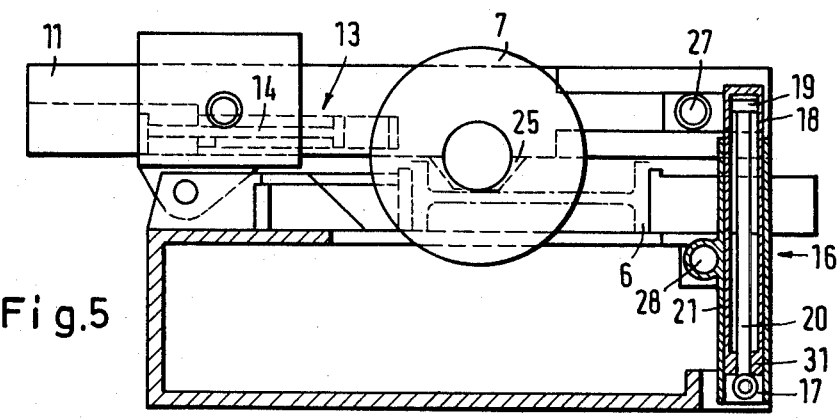
Figure 6:
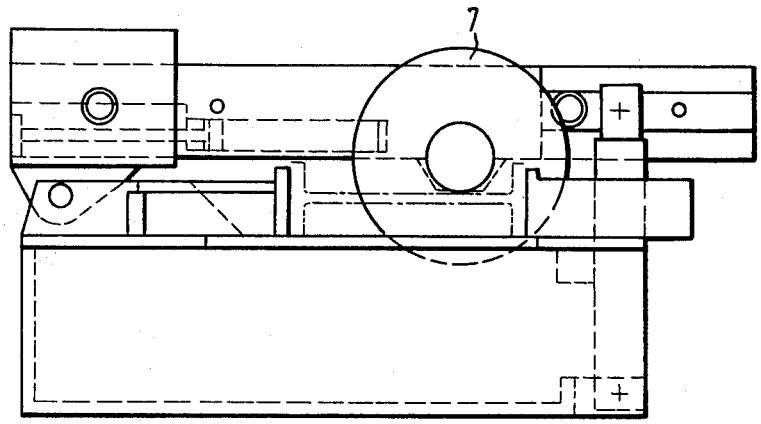
Figure 7:
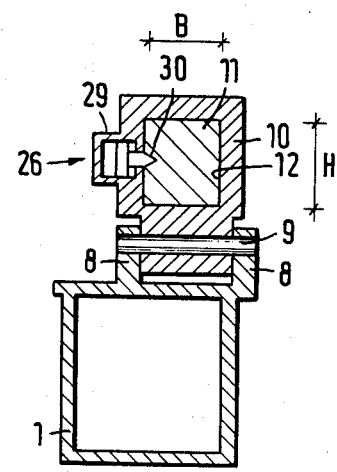
FIGS. 7 through 9 are vertical cross-sections through the saw along section lines VII through IX in FIG. 3.
Figure 8:
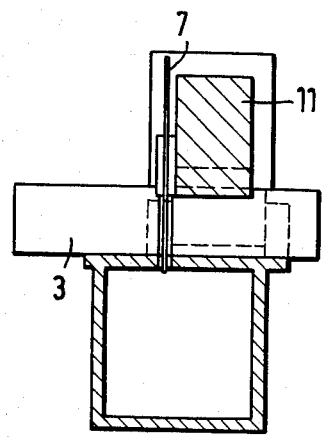
Figure 9:
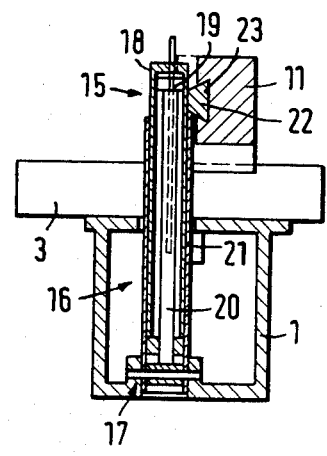
Figure 10:
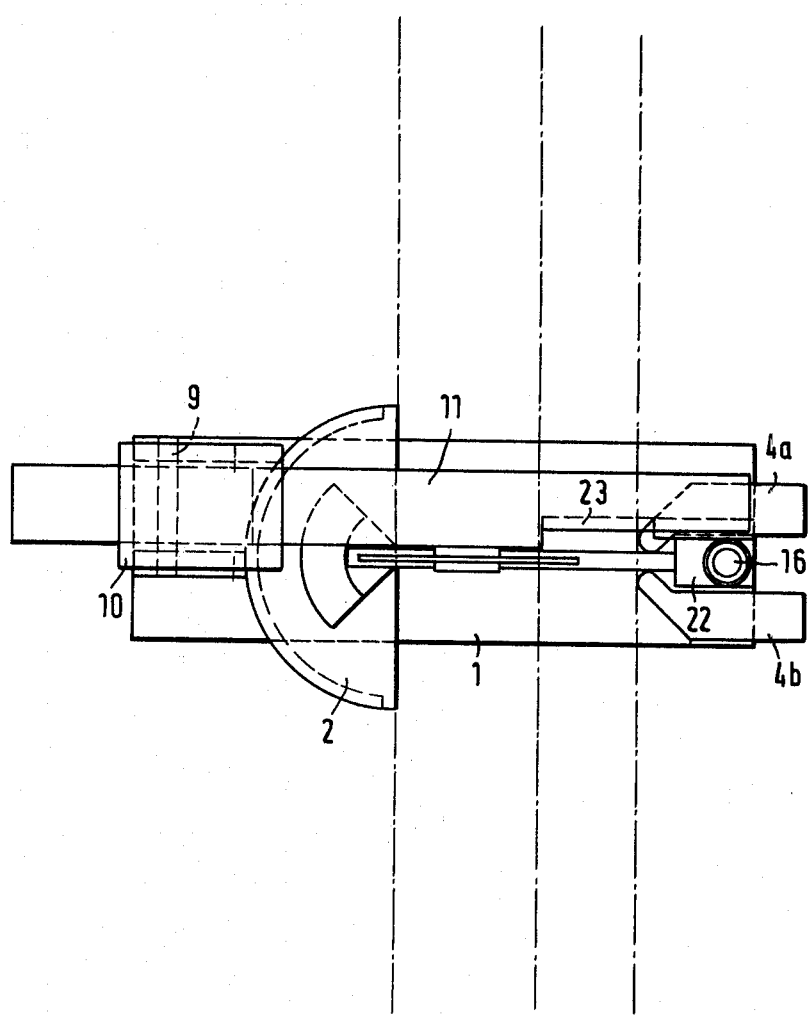
FIG. 10 is a top view of the saw.

A machine table 1 has on its top side a chuck jaw 2 with vertical contact surface 3. Chuck jaw 2 is not slidable relative to the opposing chuck jaw 4 and is only rotatable for making miter cuts. The opposing chuck jaw 4 comprises two parts 4a and 4b (FIG. 10) which are adjustable with respect to each other in order to adequately hold a tilted work piece. The work pieces shown in FIGS. 1 through 6 are I-beams which are to be sawed transversely to their longitudinal axes and therefore are being held by chuck jaws 2 and 4 with their longitudinal axes perpendicular to the saw blade 7.

A load-bearing piece 8 is disposed on the top of the machine table at the vertical level of the chuck jaws and supports a horizontal axle 9 which is parallel to the axis of the saw blade and is linked to a swingable frame 10. The frame 10 surrounds an arm 11 which is rectangular in cross-section and is in the form of a key-shaped beam with its height H greater than its width B. The open area 12 of arm 10 has dimensions corresponding to those of the cross-section of the arm 11; and arm 11 is moveable with respect to frame 10 by means of a cylinder-piston assembly 13 (FIGS. 5 and 6) which is mounted inside the hollow interior of the box-shaped arm 11 and has the end of its piston rod 14 connected to frame 10.

A vertically moveable device 16 is pivotally linked to arm 11 at the end portion of arm 11 which is opposite to the swinging pivot 8, 9 and 10; the opposite end section of device 16 being pivotally linked to machine table 1 through a hinge 17. Moveable device 16 comprises a cylinder-piston assembly with a first cylinder 18 pivotally linked to the arm, a piston 19 guided in the first cylinder, a piston rod 20 connected to hinge 17, and a second cylinder 21 which is also swingably linked to hinge 17 and in which the far end section of the first cylinder slides piston-wise, said far end section being also the one through which piston rod 20 passes.

The second pivot 15 is connected to a slide-like part 22 which has a dovetailed cross-section and is guided in a correspondingly shaped groove 23 in arm 11 which is parallel to the longitudinal axis of arm 11. Groove 23 is on the side face of arm 11 which is on the same side of the arm as that on which saw blade 7 is located.

Saw blade 7 is located between the swinging pivot and pivot 15 of arm 11, and is supported by drive 24 which is located largely inside box-shaped arm 11 and projects out from the underside of the arm with a smaller cross-section 25 than the saw blade occupies. This cross-section 25 has a height h which is somewhat less than depth t of the top depression of the horizontal I-beam work piece, so that cross-section 25 can be moved within this depression.

In order to be able to fix arm 11 with respect to frame 10, and to fix part 22 and moveable and actuatable device 16 with respect to machine table 1, locking devices 26, 27, and 28 are provided, on the frame, on part 22, and on the device 16, respectively, each of which devices has a two-sided friction catch along with a clamping piece which is pressed hydraulically against the side face of the arm or the machine table, as the case may be, by means of a cylinder-piston assembly 29. In this regard depressions or grooves 30 which match the clamping piece can be provided in the side faces.

The machine can be operated in two modes. In the first mode, shown in FIGS. 1 through 3, part 22 is fixedly clamped to arm 11, and prior to sawing, the saw blade 7 is centered over work piece 6 by shifting arm 11 with respect to the swinging pivot 8, 9 and 10; thereupon the locking device 26 is clamped tight and saw blade 7 is slowly lowered during sawing. If the work piece is wider than the diameter of the saw blade 7, the work piece is partially sawed through and then the saw blade is moved forward in the direction of the part of the work piece cross-section which still has not been cut, whereby the forward motion is supplied by longitudinally moving arm 11 after loosening locking device 26. In this maneuver, device 16 is swung around hinge 17; hence locking device 28 must be loosened. Pivot 15 and with it the end of arm 11 which is opposite to the swinging pivot pass through a circular arc which leads to a slight raising and lowering of saw blade 7 during sawing. This raising and lowering is avoided in the operating mode shown in FIGS. 4 through 6; there, after saw blade 7 is lowered to a position in which arm 11 is horizontal (FIG. 5), device 16 is locked with respect to machine table 1 by means of locking device 28, after which locking devices 26 and 27 are loosened, so that arm 11 becomes shiftable not only with respect to the swinging pivot 8, 9 and 10 but also with respect to the vertically moveable device 16, and thereby saw blade 7 can be moved parallel to the top surface of the machine table in order to be able to cut through the still uncut section of the work piece. In this way, for example, a saw blade with a diameter of 900 mm can cut an I-beam with a cross-section of 1000 mm high and 300 mm wide. Previously a saw blade with a diameter 1300 mm was needed for such a cut. Also, for example, a steel work piece 1250 mm high and 510 mm wide can be cut through with a saw blade of a diameter of 1250 mm, instead of the 1800 mm diameter which would have been needed formerly. 9n

What is claimed is:

1. A machine for sawing elongated substantially horizontal axis work pieces including a machine frame, a saw blade mounting arm, mounting means providing a first pivotal connection between said arm and said frame, said arm being longitudinally moveable with respect to said mounting means, a raising and lowering means for said arm connected to said frame, means providing a second pivotal connection between said arm and said raising and lowering means and a substantially vertically aligned saw blade carried by said arm.

2. The machine of claim 1 wherein said arm is longitudinally moveable with respect to said means providing said second pivotal connection.

3. The machine of claim 1 including a piston and cylinder assembly connected between said arm and said mounting means for moving said arm longitudinally with respect to said mounting means.

4. The machine of claim 3 wherein said piston and cylinder assembly is located internally of said arm with said piston of said assembly connected to said mounting means.

5. The machine of claim 1 including locking means for fixing said arm in position relative to said mounting means.

6. The machine of claim 2 including locking means for fixing said arm in position relative to said means providing said second pivotal connection.

7. The machine of claim 1 wherein said raising and lowering means is pivotally mounted with respect to said frame and the machine includes locking means for fixing said raising and lowering means in position relative to said frame.

8. The machine of claim 7 wherein said locking means comprises a friction catch means including a hydraulically actuated clamping piece.

9. The machine of claim 1 wherein said raising and lowering means comprises a piston and cylinder assembly.

10. The machine of claim 9 wherein said piston and cylinder assembly includes first and second cylinders and a coaxially disposed piston rod, said second cylinder being pivotally connected to a hinge at one end of said piston rod with said second cylinder surrounding said first cylinder in the telescoped condition of the assembly and at least an end section of the first cylinder being guided in the second cylinder in fluid-tight relation.

11. The machine of claim 11 including a saw blade drive means disposed at least partly within said arm.

12. The machine of claim 11 wherein the axis of said saw blade is disposed substantially at the level of the undersurface of said arm.

13. The machine of claim 1 wherein said arm has a substantially rectangular cross-section with a larger height than width.

14. The machine of claim 2 including dovetail means for longitudinally guiding said arm with respect to said means providing said second pivotal connection.

* * * * *